United States Patent Office 3,310,468
Patented Mar. 21, 1967

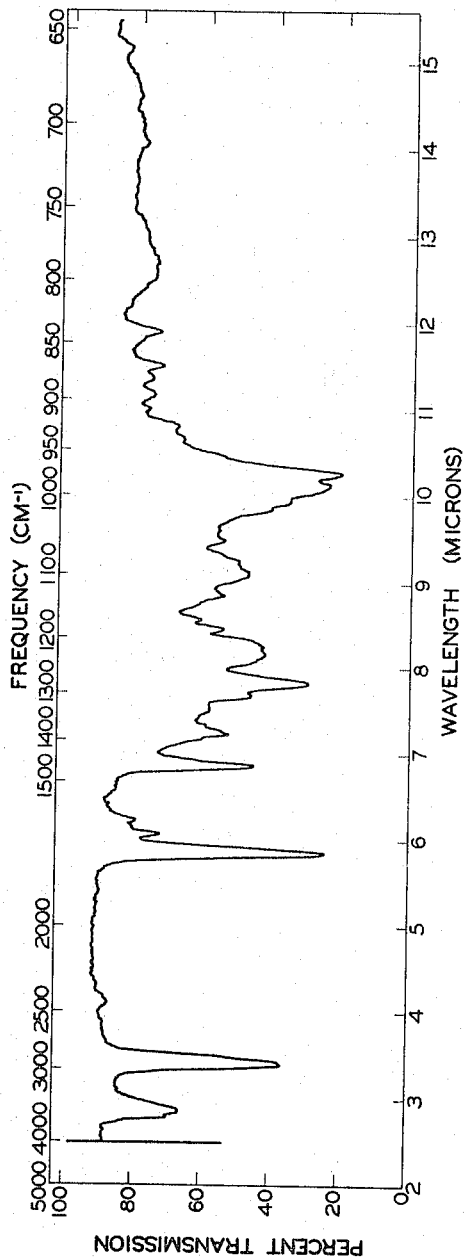

3,310,468
ANTIFUNGAL ANTIBIOTIC RUTAMYCIN AND PROCESS FOR THE PRODUCTION THEREOF
Robert Q. Thompson, Greenwood, and James M. McGuire, Indianapolis, Ind., assignors to Eli Lilly and Company, Indianapolis, Ind., a corporation of Indiana
Filed Oct. 29, 1962, Ser. No. 233,707
3 Claims. (Cl. 167—65)

This invention relates to a novel antibiotic agent and to its preparation. More particularly, this invention relates to a novel antifungal antibiotic agent denominated herein by the arbitrary name rutamycin.

Rutamycin is a crystalline white solid melting at about 127–128° C. It is soluble in most of the common organic solvents, such as the lower alcohols, lower esters, ketones, chloroform, dimethylformamide, dimethyl sulfoxide, and the like. It is only slightly soluble in solvents such as diethyl ether, and is relatively insoluble in water and hydrocarbon solvents, such as Skellysolve-B, Skellysolve-F, and the like. Rutamycin is stable for several days in buffered methanol solutions over a pH range of about 2 to about 10. It has shown little tendency toward degradation in refluxing organic solvents. Furthermore, rutamycin is stable for long periods of time when stored as the dry crystalline material, or when dissolved in suitable organic solvents.

Electrometric titration of rutamycin in 80 percent aqueous methanol or in 66 percent aqueous dimethylformamide indicates that there are no titratable groups in this compound. The ultraviolet absorption spectrum of a solution of rutamycin in ethanol has a maximum at 225 m$\mu$ with an absorptivity value of $$E_{1\,cm.}^{1\%} = 445$$

An average of several microanalyses has shown rutamycin to have approximately the following compositions: C, 68.25%; H, 9.53%; O, 21.80%; C—$CH_3$, 13.66%; active H, 1.46%. The samples employed for the analyses were dried in vacuo for two hours at 80° C. over phosphorus pentoxide. Single-crystal X-ray diffraction measurements indicate that rutamycin crystallizes from a methanol-water mixture in monoclinic crystals with lattice constants as follows: $a=20.57$ A., $b=11.17$ A., $c=11.30$ A., and $\beta=71°$. The molecular weight calculated for four molecules per unit cell is 419.2. The empirical formula calculated from these data is $C_{25}H_{42}O_6$. The pycnometric density of rutamycin was determined to be 1.143 g./cc. at 25° C.

The infrared absorption curve of rutamycin in chloroform solution is shown in the accompanying drawing. The distinguishable bands in the infrared absorption spectra over the range of 2.0 to 15.0 microns are as follows: 2.85, 3.39, 5.86, 6.08, 6.24, 6.86, 7.23, 7.67, 7.81, 8.2, 8.44, 8.55, 8.85, 9.10, 9.49, 9.84 (shoulder), 9.94 (shoulder), 10.12, 10.26, 10.81, 11.00, 11.17, 11.35, 11.49, and 11.89 microns.

In dioxane solution, at a temperature of 25° C., the specific rotation of sodium D light by rutamycin is —40.3° when the concentration of the antibiotic is 4.4 percent on a weight per volume basis. The sample employed for the determination of the optical rotation was crystallized from aqueous methanol and was dried at room temperature in a vacuum desiccator over phosphorus pentoxide.

Rutamycin has an inhibitory action against the growth of fungi which are pathogenic to animal and plant life. The in vitro antifungal spectrum of rutamycin, as determined by the agar dilution procedure, is shown in Table I. The inhibitory concentrations given in Table I are the minimum concentrations of the antibiotic which are required for complete inhibition of fungal growth.

TABLE I.—ANTIFUNGAL SPECTRUM OF RUTAMYCIN IN VITRO

| Test Organism: | Minimum inhibitory Concentration [a], $\mu$g./ml. |
|---|---|
| Alternaria solani G368 | 3.13 |
| Aspergillus niger M45–440 | 3.13 |
| Botrytis cinerea M45–298 | 1.56 |
| Ceratostomella ulmi M45–607 | 0.78 |
| Colletotrichum lagenarium G391 | 0.2 |
| Colletotrichum pisi G2 | 0.4 |
| Collectotrichum phomoides G277 | 0.4 |
| Endoconidiophora fagacearum G80 | 25.0 |
| Epidermophyton floccosum ATCC 10227 | 6.25 |
| Fusarium moniliforme M45–399 | 6.25 |
| Fusarium oxysporium lycopersici G24 | 6.25 |
| Glomerella cingulata G22 | 1.56 |
| Helminthosporium sativum G366 | 1.56 |
| Microsporum canis ATCC 10214 | 6.25 |
| Pellicularia filamentosa G422 | 25.0 |
| Penicillium expansum M45–883 | 6.25 |
| Phomo pigmentovora M45–467 | 3.13 |
| Polyporus ostreatus A6719 | 6.25 |
| Pullularia sp. M45–570 | 0.78 |
| Pythium irregulare G389 | 0.4 |
| Sclerotinia fructicola G177 | 0.78 |
| Trichophyton interdigitale A19 | [b] 3.13 |
| Trichophyton rubrum A20 | [b] 1.56 |
| Trichophyton mentagrophytes ATCC 9129 | 25.0 |
| Verticillium albo-atrum G196 | 0.78 |

[a] All readings were made at 72 hours unless otherwise noted.
[b] Readings made at 48 hours.

Because of the uncertainty of taxonomic studies with the Streptomyces group of organisms, there is always an element of doubt associtaed with the classification of a newly discovered organism. The newly discovered organism which produces rutamycin is similar in some respects to the previously described Streptomyces species S. arabicus NRRL 1738, S. parvullus NRRL 1628, and S. rutgersensis NRRL 1256. All of these organisms are similar in sporophore morphology, spore colors, vegetative mycelium color, and carbon utilization patterns. They differ in certain colony characteristics on specific media, in promoting gelatin liquefaction, and in their action on milk. The new organism is believed to be closer to the above S. rutgersensis NRRL 1256 than to any other heretofore described organism. However, the number of dissimilarities between the new organism and the previously described S. rutgersensis strain, which does not produce rutamycin, requires the classification of the newly discovered organism as a new strain of S. rutgersensis. The strain of the organism which we have employed for the production of rutamycin has been placed on permanent deposit with The American Type Culture Collection at Washington, D.C. and is available to the public under ATCC accession No. 14876.

The organism was isolated from a soil sample by suspending portions of the sample in sterile distilled water and streaking the suspension on nutrient agar. The seeded nutrient agar plates were incubtaed at 25–35° C. until visible colonies were observed. At the end of the incubation period, colonies of the rutamycin-producing organism were transferred with a sterile platinum loop to agar slants. The agar slants were then incubated to provide suitable quantities of inoculum for the production of rutamycin.

The methods employed in the taxonomic studies of the rutamycin-producing strain of S. rutgersensis ATCC 14876 are those commonly used in the taxonomy of actinomycetes. Carbon utilization tests were carried out according to the method described by Pridham and Gottlieb, J. Bact., 56, 107 (1948). Results of the taxonomic studies are given in the paragraphs which follow. The numbers in parentheses refer to color blocks in Maerz and Paul, Dictionary of Color (1950). Cultures were grown at 30° C. The morphology of cultures was observed on tomato paste-oatmeal agar and Czapek's agar. Morphological, physiological, and cultural characteristics were determined after 14 days' incubation. Carbon utilization was observed after 10 days' incubation.

*Microscopic morphology*

Spore chain morphology—Spore chains are either loops or compact to loose spirals. The spores are spherical to elliptical.

*Cultural characteristics*

Tomato paste-oatmeal agar—Growth abundant. Aerial mycelium moderate, light gray (44–1A). Reverse dark red-brown. No soluble pigment.

Nutrient agar—Growth fair. No aerial mycelium. Reverse pale yellow. No soluble pigment.

Czapek's agar—Growth moderate. Fair aerial mycelium, white. Reverse pale yellow. No soluble pigment.

Yeast extract—Growth abundant. Aerial mycelium moderate, medium gray (37–2A). Reverse red-brown. No soluble pigment.

Calcium malate agar—Growth moderate. Fair aerial mycelium, white. Reverse pale yellow. No soluble pigment.

Inorganic salts-starch agar—Growth abundant. Aerial mycelium abundant, light gray (45–1A). Reverse red-brown. Trace of soluble brown pigment.

Potato plug—Growth abundant, wrinkled, moist, pale yellow. No aerial mycelium. Plug slightly darkened.

*Physiology*

Skim milk—No coagulation; hydrolysis after 14 days; pH 6.2.

Gelatin liquefaction—None.
Nitrate reduction—None.
$H_2S$ Production—None.

In the following table are set forth the results of carbon utiliztaion tests carried out on organism ATCC 14876. In the table, the symbols employed to indictae growth response are interpreted as follows:

$+$ = positive utilization
$(+)$ = probable utilization
$(-)$ = doubtful utilization
$-$ = no utilization

TABLE II.—CARBON UTILIZATION PATTERN FOR ATCC 14876

| Carbon Source: | Growth response |
|---|---|
| L(+)-arabinose | + |
| L(+)-rhamnose | + |
| D-ribose | + |
| D(+)-xylose | + |
| D(−)-fructose | (+) |
| D(+)-mannose | + |
| D(+)-glucose | + |
| Lactose | + |
| Maltose | + |
| Sucrose | − |
| D(+)-trehalose | + |
| D(+)-raffinose | (−) |
| Cellulose | (−) |
| Inulin | − |
| i-Inositol | − |
| Mannitol | + |
| d-Sorbitol | (−) |
| Salicin | (+) |

It is to be especially noted that rutamycin exhibits a relatively high activity against several dermatophytic species, a property which makes it useful for the suppression of organisms such as those which cause athlete's foot, ringworm, and the like. This activity makes rutamycin especially valuable as a component of disinfectant solutions such as those employed around swimming pools, public showers, and the like.

The acute toxicity of rutamycin has been determined in mice by both the oral and intraperitoneal routes of administration. By oral administration, rutamycin has an $LD_{50}$ of approximately 800 mg./kg.; by intraperitoneal injection, the $LD_{50}$ has varied from 18 to 74 mg./kg. for crystalline preparations of similar purity. No satisfactory explanation is currently available for the wide variation in toxicity by the IP route.

A comparison of the properties of rutamycin with the published data for the oligomycins A, B, and C, reveals many similarities. However, the specific differences which exist in the behavior on paper chromatography, toxicity, X-ray characteristics, optical rotation, molecular formulae, melting point, and antifungal spectrum establish the fact that rutamycin is indeed a new anti-fungal antibiotic. Especially significant is the fact that the oligomycins exhibit no activity against the dermatophytic fungi.

The novel antibiotic of this invention is produced by culturing a rutamycin-producing strain of *S. rutgersensis* under aerobic conditions in a suitable culture medium until the culture medium contains substantial antibiotic activity. Most of the antibiotic activity produced during the fermentation of rutamycin is found in association with the mycelia. Accordingly, the antibiotic can be recovered by employing the various isolation and purification procedures utilized in the art for the recovery of such antibiotics.

The culture medium employed in producing rutamycin by cultivation of ATCC 14876 can be any one of several media, since, as is evident from the above-described utilization tests, the organism is capable of utilizing energy from a variety of sources. In general it can be said that the medium should include a source or sources of assimilable carbon and nitrogen, together with the mineral salts commonly recognized as necessary or desirable in the growth of microorganisms. A source of growth factors, such as yeast or yeast extract, can be employed in the media with beneficial results. For economy of product, maximum yield of antibiotic, and ease of isolation, certain cultural media containing relatively simple nutrient sources are preferred.

Satisfactory sources of carbon include glucose, fructose, maltose, mannose, soluble starch, molasses, dextrin, brown sugar, corn steep solids, and the like, glucose being preferred.

Satisfactory sources of nitrogen include beef extract, peptones (meat or soy), hydrolyzed casein, yeast, amino acid mixtures, and the like. Currently preferred sources of nitrogen are peptones, hydrolyzed casein, and beef extracts.

Among the minerals which the medium may include are those providing calcium, magnesium, sodium, potassium, chloride, sulfate, and carbonate ions.

As is necessary for the growth and development of other microorganisms, it will be understood that essential trace elements of various kinds, some organic and some mineral, should be included in the culture medium for growing the actinomycete employed in this invention. Such trace elements are commonly supplied as impurities incidental to the addition of the other constituents of the medium.

The initial pH of the culture medium can be varied widely. However, it has been found desirable to initiate the fermentation in a medium of pH between about 6 and about 8 and, preferably, about 6.5 to about 7.4. As has been observed with some other actinomycetes, the pH of the medium falls somewhat during the early stages of the fermentation, then gradually increases during the later stages of the growth period of the organism while rutamycin is being produced. Ultimately, the pH may attain a level equal to or greater than the initial pH, the final pH being dependent at least in part upon such factors as the initial pH of the medium, the buffers present in the medium, and the length of time the organism is permitted to grow.

Submerged aerobic cultural conditions are the conditions of choice for the production of rutamycin. For preparation of relatively small quantities of the antibiotic, shake flasks and surface culture in bottles can be employed. However, for the preparation of larger amounts of the antibiotic, submerged aerobic culture in sterile tanks is preferred. The fermentation medium in the sterile tank can be inoculated with a sporulated suspension. However, inasmuch as a growth lag is experienced when a sporulated suspension is employed as the inoculum, the vegetative form of the culture is preferred. By avoiding the growth lag in this manner, more efficient utilization of the fermentation equipment is realized. Accordingly, it is desirable first to produce a vegetative inoculum of the organism by inoculating a relatively small quantity of a culture medium with the spore form of the organism and, when a young, active vegetative inoculum has been obtained, to transfer the vegetative inoculum aseptically to the large fermentation tank. The medium in which the vegetative inoculum is produced can be either the same as or different from the medium utilized for the large scale production of rutamycin.

The organism which produces rutamycin grows best at temperatures in the range of about 25 to about 32° C. Optimal rutamycin production appears to occur at a temperature of about 28 to 30° C.

As is customary in aerobic submerged culture processes, sterile air is blown through the culture medium during the fermentation. For efficient growth of the organism and consequent efficient production of rutamycin, the volume of air employed in the tank production of rutamycin is preferably upwards of about 0.1 volume of air per minute per volume of culture medium. Most efficient growth and optimal yields of rutamycin are obtained when the volume of air used is at least one half volume of air per minute per volume of culture medium.

The concentration of rutamycin activity in the culture medium can readily be followed during the fermentation period by testing samples of the culture medium for their inhibitory activity against the growth of an organism known to be inhibited in the presence of rutamycin. The use of the organism Neurospora, sp. has been found to be suitable for this purpose. The testing of the samples can be carried out by the known turbidimetric or cup-plate methods.

In general, maximum production of the antibiotic occurs within about two to five days after inoculation of the culture medium when submerged aerobic culture or shake flask culture is employed and within about five to ten days when surface culture is employed.

Inasmuch as most of the antibiotic produced during the fermentation of rutamycin is located in the mycelia, isolation techniques are designed to permit maximum recovery of the antibiotic from this source. Thus, for example, the fermentation broth as obtained may be filtered and the antibiotic recoverd from the filter cake by thorough extraction with a suitable solvent such as methanol, aqueous acetone, or the like. Such a procedure not only permits efficient recovery of the antibiotic, but also eliminates the necessity of handling the relatively large volumes of solvents which are required when normal extractive techniques are employed. The antibiotic can be recovered from the extracting solvent by the ordinary methods employed in the art.

In order to illustrate more fully the operation of the invention, the example which follows is provided by way of illustration. Although the description contained herein will be made with particular reference to the newly found organism *S. rutgersensis* ATCC 14876, it is to be understood that the production of rutamycin by the growing of other rutamycin-producing strains of *S. rutgersensis* or mutants of rutamycin-producing strains of *S. rutgersensis*, including mutants of ATCC 14876, are within the scope of this invention. Such other strains or mutants can be produced by known procedures, such as by subjecting a rutamycin-producing strain of *S. rutgersensis* to X-ray or ultraviolet irradiation, or to the action of chemical agents, such as, for example, the nitrogen mustards.

EXAMPLE

Spores of *Streptomyces rutgersensis* strain ATCC 14876 are inoculated on a nutrient agar slant having the following composition:

| | G. |
|---|---|
| Starch | 20 |
| Asparagine | 1 |
| Beef extract | 3 |
| Agar | 20 |
| Water, q.s. to make 1 l. | |

The slant is incubated for about 5 days at about 30° C. and is then covered with a small amount of sterile distilled water and is scraped gently to loosen the organisms and obtain an aqueous suspension.

Ten milliliters of the suspension so obtained are used to inoculate one liter of a sterile vegetative growth medium having the following composition:

| | G. |
|---|---|
| Cerelose | 15 |
| Soybean meal | 15 |
| Corn steep solids | 5 |
| Sodium chloride | 5 |
| Calcium carbonate | 2 |
| Water, q.s. to make 1 l. | |

The growth medium is sterilized at a temperature of about 120° C. and a pressure of about 15 p.s.i. for about 30 minutes prior to being inoculated. The inoculated medium is grown for 48 hours at 30° C. with constant shaking on a reciprocal shaker to produce the vegetative form of the organism. The resulting vegetative inoculum is then employed to inoculate a sterile production culture medium having the following composition:

| | | |
|---|---|---|
| Dextrose, technical grade | g | 10 |
| Bacto-Peptone (Difco) | g | 5 |
| Calcium carbonate | g | 2 |
| Brer Rabbit molasses | ml | 20 |
| P-2000 [a] | ml | 0.08 |
| Water, q.s. to make 1 l. | | |

[a] A polyalkylene glycol defoaming agent sold by the Dow Chemical Company.

The inoculated culture medium contained in a 45-liter fully baffled fermentation tank equipped with a 5-inch six-bladed impeller is allowed to ferment at a temperature of about 30° C. and throughout the fermentation period is stirred and aerated with sterile air at the rate of about ½ volume of air per volume of culture medium per minute. The fermentation is allowed to proceed for about 70 hours, during which time the culture medium drops to a pH of about 6.5 to 6.8 about 24 hours after inoculation, then gradually returns to its initial pH of about 7.2 to 7.4.

Fifty liters of fermentation broth so prepared are mixed with 2.5 kg. of Hyflo Super-Cel filter aid and the mixture is filtered. The filtrate is discarded and the wet filter cake is extracted three times by stirring for 30 minutes with 12 liters of 70% aqueous acetone. The extract in each case is separated by filtration. The acetone is removed from the combined extracts by evaporation under reduced pressure. The remaining aqueous concentrate containing rutamycin is extracted three times with three ½-liter portions of ethyl acetate. The spent aqueous phase is discarded. The ethyl acetate is removed under reduced pressure, leaving a viscous residue which contains the antibiotic activity. This residue is dissolved in 350 ml. of methanol to yield a solution which contains 137 mg. of solids per milliliter. The methanolic solution is stirred for 30 minutes with 17.5 g. (5%) Norite SG activated carbon and is then filtered. The filtrate is again treated with 5% Norite SG and refiltered. The treated filtrate is concentrated to about 150 ml. and is refrigerated to promote crystallization of the rutamycin. After several days, 12.2 g. of colorless crystalline rutamycin melting at about 126° C. are obtained. A second crop of 7.4 g. of slightly colored crystals melting at about 117–119° C. is harvested subsequently. The overall recovery of rutamycin from the initial acetone extracts to the crystalline antibiotic is about 80%.

An alternate method of inducing crystallization of the rutamycin is as follows. The decolorized filtrate obtained after treatment with Norite SG is concentrated in vacuo to yield a viscous oil. This oil is poured into about five volumes of Skellysolve-B and the mixture is allowed to stand until the precipitate which forms has settled. The supernatant is decanted, the precipitate is dissolved in methanol, and water is added to incipient opalescence. Upon refrigeration, the rutamycing crystallizes from the aqueous methanol.

Purification of the rutamycin is effected as follows. About 5 g. of the material melting at about 126° C. are dissolved in a minimum quantity of hot methanol, and water is added slowly to incipient opalescence. The solution is refrigerated overnight, during which time the rutamycin crystallizes. The crystals are harvested by filtration and washed lightly with a 1:1 mixture of diethyl ether and Skellysolve-B. This procedure yields 4.4 g. of vacuum-dried rutamycin melting at about 127–128° C. A product of similar purity can be obtained by employing diethyl ether as a solvent for recrystallization.

We claim:

1. A method of producing rutamycin which comprises cultivating a rutamycin-producing strain of *Streptomyces rutgersensis* ATCC 14876 in a culture medium containing assimilable sources of carbohydrate, nitrogen, and inorganic salts under submerged aerobic conditions until a substantial amount of rutamycin is produced by said organism in said culture medium.

2. A method of producing rutamycin which comprises cultivating a rutamycin-producing strain of *Streptomyces rutgersensis* ATCC 14876 in a culture medium containing assimilable sources of carbohydrate, nitrogen, and inorganic salts under submerged aerobic conditions until a substantial amount of rutamycin is produced by said organism in said culture medium, and recovering the rutamycin from the fermentation product mixture.

3. The antibiotic rutamycin, said antibiotic being a white crystalline solid substance melting at 127–128° C.; which is soluble in the lower alcohols, lower esters, ketones, chloroform, dimethylformamide, and dimethyl sulfoxide, is slightly soluble in diethyl ether, and is relatively insoluble in water and hydrocarbon solvents; which has an optical rotation $[\alpha]_D^{25°}$ of $-40.3°$ (c.=4.4, dioxane); which has the approximate composition of 68.25 percent carbon, 9.53 percent hydrogen, and 21.80 percent oxygen; which crystallizes from aqueous methanol in monoclinic crystals with lattice constants as determined by single-crystal X-ray diffraction of $a=20.57$ A., $b=11.17$ A., $c=11.30$ A., and $\beta=71°$; which has a molecular weight, calculated from X-ray diffraction data, of about 419.2; which has an empirical formula, calculated from the foregoing data, of $C_{25}H_{42}O_6$; which has a maximum in its ultraviolet absorption spectrum (determined in ethanol solution) at 225 m$\mu$, with an absorptivity value of $$E_{1\,cm.}^{1\%}=445$$

and which, as a solution in chloroform, has the following distinguishable bands in its infrared absorption spectrum over the range of 2.0–15.0 microns: 2.85, 3.39, 5.86, 6.08, 6.24, 6.86, 7.23, 7.67, 7.81, 8.2, 8.44, 8.55, 8.85, 9.10, 9.49, 9.84 (shoulder), 9.94 (shoulder), 10.12, 10.26, 10.81, 11.00, 11.17, 11.35, 11.49, and 11.89 microns.

References Cited by the Examiner

The Pfizer Handbook of Microbial Metabolites, Miller, 1961, pp. 582, 606.

SAM ROSEN, *Primary Examiner.*